June 7, 1938.  W. RAISCH  2,119,601
APPARATUS FOR TREATING MATERIAL
Filed Sept. 11, 1936
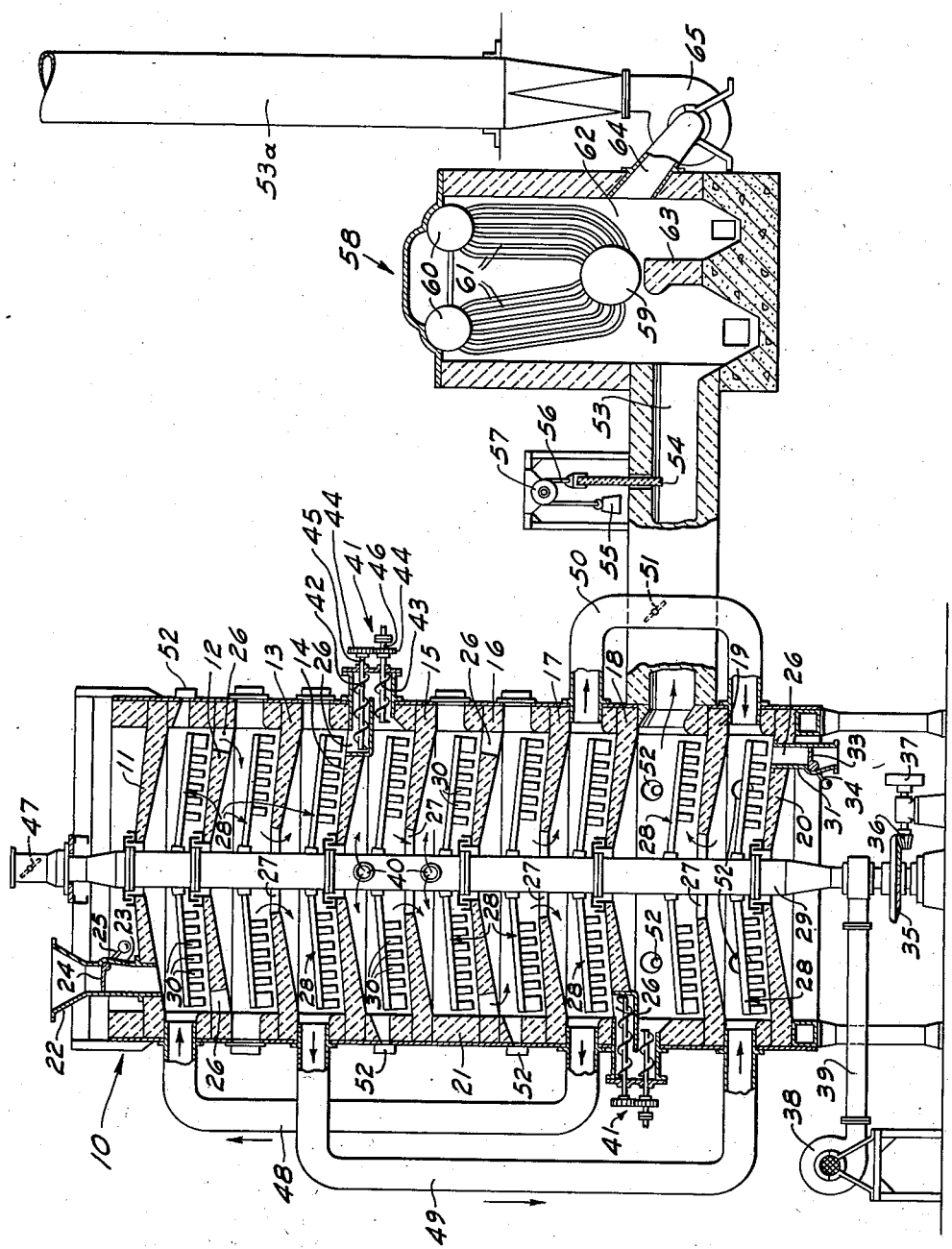
INVENTOR
William Raisch
BY
*Louis L. Ansart*
his ATTORNEY Patented June 7, 1938

2,119,601

UNITED STATES PATENT OFFICE 2,119,601

APPARATUS FOR TREATING MATERIAL

William Raisch, New York, N. Y., assignor to Underpinning & Foundation Co., Inc., New York, N. Y., a corporation of New York Application September 11, 1936, Serial No. 100,282

10 Claims. (Cl. 110—12)

The present invention relates to the treatment of material including a step of burning or roasting, and more particularly to treatment in which moisture and volatile constituents are driven off by heating in a preliminary stage of operation and the solid residue is roasted or burned.

The principal objects of the invention are to provide novel, advantageous and efficient apparatuses and processes for effecting treatment of this kind. An important feature of the apparatus resides in providing a multiple-hearth furnace, in which the material is fed downwardly from hearth to hearth through outlets for said hearths, with material-feeding devices or valves at certain hearths to pass the material through the corresponding outlets while preventing the passage of gases. In this way the zones of treatment, corresponding to the compartments over the various hearths, may be separated into groups of zones, between which there is no direct passage of gases, for example an uppermost drying group, an intermediate or central group and a lowermost deodorizing group. Correspondingly the furnace would include an uppermost drying section, a central burning section and a lowermost final combustion and deodorizing section.

Other features relate to the use of part of the combustion gases from the burning section to assist the drying operation in the drying section and the final burning in the lowermost section, to the treatment of gases and vapors from the drying section in the lower section for final burning and deodorizing, and to the manner in which heat from one part is utilized in another.

While applicable to the treatment of various materials, the present invention is particularly adapted for the disposal of waste material such as sewage solids in the form of sludge or screenings having a high moisture content.

In carrying out the invention, especially as applied to the disposal of sewage solids, use may be made of a multiple-hearth furnace comprising vertically spaced hearths with outlets at the center of one and the periphery of the next and vice versa, and rabbling means comprising a hollow shaft and rabbling devices extending therefrom over the hearths and arranged so as to work the material to the outlets of the hearths with which they are associated.

For better control in operation, the furnace may be divided into an uppermost or drying section, a central or burning section and a lowermost or deodorizing section. Such division of the furnace may be effected by selecting certain hearths and providing at their outlets devices or valves adapted to discharge material to the next lower hearths and at the same time to prevent the passage of gases through the corresponding outlets.

Preheated air is admitted to the burning section and hot gases drawn from this section are passed through the uppermost and drying section to dry the material preparatory to burning. The gases are cooled considerably in the drying zone and mixed with vapors and then passed to the lowermost or deodorizing zone. Not all of the hot gases are passed to the drying zone, the rest of them being passed to the lowermost or deodorizing section and serving to raise the temperature of the gases from the drying section. To assure complete combustion of the gases, additional heating for the lowermost section may be provided, as by the use of one or more fluid fuel burners. The proportions of the hot gases passing from the burning section to the drying section and to the deodorizing section may be varied as required. Preferably the draft in the burning zone and the drying section is concurrent with the movement of material in these zones and in the lowermost section is countercurrent to the flow of material.

Preferably the hollow shaft operating the rabbling devices over the various hearths is utilized in supplying to the burning section air preheated in the portion of the hollow shaft passing through the deodorizing section and part of the burning section. If desired, burners may be used in the drying hearth and of course in the burning zone.

The gases may be discharged from the lowermost or deodorizing section in any suitable manner as by utilization of natural draft. Preferably, however, the draft or flow of gases through the furnace is established in any suitable manner, as by means including a suction fan connected with the outlet of the deodorizing section. There may be a considerable quantity of heat in the gases drawn from the deodorizing section and this may be recovered to a considerable extent, as by passing the gases through a waste-heat boiler installation.

Obviously the raising of temperature, to produce burning in some parts, may be effected by use of other kinds of auxiliary fuel. Also, if considerable readily combustible be mixed with the less combustible sewage solids, the amount of supplementary fuel to be used may be reduced substantially. In some cases such additional combustible material, such as fine coal or paper, may be mixed with the sewage solids in connection with a screening operation, or in a settling tank, or in connection with dewatering the sludge by use of a filter.

Other objects, features and advantages will appear upon consideration of the following description and of the drawing in which the figure is a sectional elevation illustrating an apparatus embodying a preferred form of the invention.

Referring to the drawing, the invention may be embodied in an apparatus including a multiple-hearth furnace 10 having a top 11, hearths 12 to 20 inclusive, and a peripheral wall 21 in which the top and hearths are supported. Material is deposited on the uppermost hearth 12 through a hopper 22, and a chute 23 extending through the top 11 of the furnace and provided with a pivoted door or gate 24 normally held in closed position by means of a weighted arm 25. As soon as a sufficient amount of material, to overcome the counterbalancing action of the arm 25, collects on the door 24, the door or gate swings downwardly about its pivotal support and the material on the door falls to the hearth 12.

In order that the material on each hearth may, in connection with agitation thereof, be brought into a layer and gradually fed downwardly to a lower hearth or out of the furnace from the hearth 20 which forms the bottom of the furnace, each of the hearths 12, 14, 16, 18 and 20 may be provided with one or more discharge openings or outlets 26 adjacent to its periphery, and the hearths 13, 15, 17 and 19 may be provided at their central portions with outlets, preferably in the form of large central outlets 27.

The agitation of the material on the hearths and the movement of the material toward the discharge openings or outlets may be effected by providing over each hearth one or more rabbling devices 28 in the general form of an arm projecting radially from a hollow central shaft 29 that passes through the central parts of the central openings 27 in the hearths 13, 15, 17 and 19 and through the central portions of the other hearths 12, 14, 16, 18 and 20 and through top 11 with relatively little clearance, gas seals being provided at these points to prevent passage of gases through these last-mentioned hearths adjacent the central shaft 29. Each of the rabbling devices 28 may be provided with a series of blades 30 so inclined as to either work the material outwardly to peripheral discharge openings 26 or inwardly to central discharge openings 27.

The hearth 20, constituting the bottom of the furnace may have but a single outlet 26 provided with a chute 31 equipped with a pivoted gate or door 33 urged to closing position by suitable counterbalancing means such as a weighted arm 34 serving to hold the door closed until a sufficient weight of material has fallen on said door 33 and causes it to open.

The central hollow shaft 29 may be rotated in any suitable manner, as by a large bevel gear 35 mounted on the shaft 29 and meshing with a bevel gear or pinion 36 rotated by a pulley 37 fixed on the same shaft and receiving power from a prime mover in any suitable manner. Air may be forced into the lower end of the shaft 29 by any suitable means such as a fan 38 and a connecting duct 39. The air forced into the shaft 29 will be heated and may be utilized to aid the furnace operation as by discharging it into the compartments or zones above certain hearths, such as hearths 15 and 16, through openings or outlets 40.

An important feature of the apparatus relates to the division of the furnace 10 into an uppermost drying section, a central burning section and a lowermost section in which combustion of the gases and other materials is completed and offensive odors are eliminated. To this end the hearth 14 may be used to separate the drying section from the central burning section, and the hearth 18 may be used to separate the central burning zone from the lowermost deodorizing section. In order to prevent the flow of gases through the outlets 26 of the hearths 14 and 18, there may be provided at each of these hearths a valve or feed device 41 which permits the passage of the solid material but prevents the passage of gases through the corresponding outlet 26.

Preferably each feed device 41 is of the screw-feed type and comprises a conveyor screw 42 which working in a suitable casing carries the material, dropping through the corresponding opening 26, along for a substantial distance to an outlet where it drops to a lower casing containing a conveyor screw 43 which moves the material in the opposite direction and discharges it into the next lower compartment. The conveyor screws 42 and 43 may be caused to move in opposite directions by intermeshing gears 44 mounted on their respective shafts 45 and 46. As indicated on the drawing, shaft 46 may be driven from any suitable source of power. It will be evident that the material passing through the feed devices or valves 41 serves to prevent the flow of gases through these devices.

The hot gases of combustion from the burning section are used directly in drying the material supplied to the uppermost or drying section. Preferably preheated air is supplied to the burning section, as already described, from the hollow vertical shaft 29 through outlets 40 in the upper part of the burning section. The upper end of the shaft 29 may be provided with a damper 47 to control the passage of air therethrough. From the lower part of the burning section, hot gases from the down draft may be passed through a duct 48 to the upper compartment of the drying section.

During the passage of the gases downwardly through the drying section the gases are cooled to a substantial amount. The cooled gases with vapors taken from the dried material are discharged from the lowermost compartment into a duct 49 which discharges into the lowermost compartment of the deodorizing section. Here the gases must be raised to a much higher temperature to complete the combustion of the gases and eliminate noxious odors.

This rise in temperature may be effected partly by supplying hot gases from the lowermost compartment of the burning section to the lowermost section of the deodorizing section through a duct or pipe 50 provided with a damper 51. Necessary additional heating may be provided by burning additional fuel, for example fluid fuel supplied to burners 52.

The burning and drying sections are also supplied with burners 52 for use when required.

The deodorized hot gases from the deodorizing section may be discharged through a flue 53 connected with the uppermost compartment of the section and provided with a suitable damper 54. As illustrated the damper is vertically movable and is counterbalanced by a weight 55 connected with the damper by a flexible member or rope 56 passing over a pulley 57.

The gases may pass directly from the flue 53 to a stack 53a but in view of the heat supplied for final burning of the gases and the consequent high temperature of the gases, it is desirable to recover some of this heat. This may be done in any suitable manner as by using the gases to heat a waste-heat boiler 58 comprising a water drum 59, steam drums 60 and tubes 61 connecting the water drum with the steam drums. The hot gases from the flue 53 pass into the lower part of a furnace chamber 62 and between the tubes 61, being directed to the tubes by a bridge wall 63 extending upwardly from the bottom of the chamber to the water drum 59. After passing between the tubes 61, the gases pass through a duct 64 to a fan 65 which delivers them to the stack 53ᵃ.

The operation may be substantially as follows:
In starting the apparatus material is introduced into the uppermost compartment of the furnace, the rotation of the shaft 29 started and the fans 38 and 65 started. The burners 52 associated with the burning section may also be started as well as the burner 52 for the drying section and one or more burners 52 for the deodorizing section. Ordinarily the burner or burners 52 for the drying section may be turned off after the furnace is heated up, but some or all of the burners in the burning section will be kept in use. In some instances, the material being treated may contain enough easily combustible material of high calorific value to furnish all the necessary heat in the burning section, thus making it possible to dispense with the use of the burners in the burning section after the furnace is fully heated up.

Due to the action of the fan 65 the pressure in the flue 53 will be below atmospheric pressure and there will be a down draft in the burning section from the outlets 40 in the shaft 29 to the lowermost compartment of the section from which the hot gases may pass through the duct 48 to the upper part of the drying section or directly to the lower part of the deodorizing section through the duct 50 as controlled by the damper 51. From the bottom of the drying section the gases, substantially cooled in drying the material, will flow through the duct 49 to the lower part of the deodorizing section where they will be mixed with the hot gases introduced through the duct 50 and finally burned and deodorized with the use of the burners 52 when necessary. In normal operation the temperature of the gases flowing through the duct 48 may be about 1200° F. and the temperature of the gases flowing through the duct 49 may be about 350° F.

It should be noted that in the drying and burning section the flow of gases is concurrent with the flow of material and in the deodorizing section the flow of gases is counter-current to the flow of material. It will be evident that the passing of the preheated air downwardly through the central burning section causes the combustion gases and vapors to pass through the low and hottest part of the burning section, thus tending to eliminate odors, and that the passing of some hot gases from the burning zone downwardly through the drying section assures the application of the greatest amount of heat to the material at the beginning of the drying operation.

It should be understood that various changes may be made and that various features may be used without others, without departing from the true scope and spirit of the invention.

Having thus described my invention, I claim:

1. Apparatus of the class described comprising a multiple-hearth furnace having vertically spaced hearths with outlets through which the material introduced at the top of the furnace may pass downwardly to the lowermost hearth and then be discharged from the furnace, means at the outlets of two hearths to prevent the passage of gases and divide the furnace into an uppermost drying section, an intermediate burning section and a lowermost section for subjecting the gases to high temperatures to complete combustion thereof and remove noxious odors before discharge from the furnace, means for supplying preheated air to the burning section, a duct conducting hot gases from the burning section to the drying section, a duct connecting the drying section with the lowermost section of the furnace, and a flue connected with said lowermost section to discharge gases of combustion from the furnace.

2. Apparatus of the class described comprising a multiple-hearth furnace having vertically spaced hearths with outlets through which the material introduced at the top of the furnace may pass downwardly to the lowermost hearth and then be discharged from the furnace, means at the outlets of two hearths to prevent the passage of gases and divide the furnace into an uppermost drying section, an intermediate burning section and a lowermost section for subjecting the gases to high temperatures to complete combustion thereof and remove noxious odors before discharge from the furnace, means for supplying preheated air to the burning section, a duct conducting hot gases from the burning section to the drying section, a second duct connecting the drying section with the lowermost section of the furnace, a third duct connecting the burning section with the lowermost section, and a flue connected with said lowermost section to discharge gases of combustion from the furnace.

3. Apparatus of the class described comprising a multiple-hearth furnace having vertically spaced hearths with outlets through which the material introduced at the top of the furnace may pass downwardly to the lowermost hearth and then be discharged from the furnace, means at the outlets of two hearths to prevent the passage of gases and divide the furnace into an uppermost drying section, an intermediate burning section and a lowermost section for subjecting the gases to high temperatures to complete combustion thereof and remove noxious odors before discharge from the furnace, means for supplying preheated air to the burning section, a duct conducting hot gases from the burning section to the drying section, a duct connecting the drying section with the lowermost section of the furnace, and means for drawing the final gases of combustion from said lowermost section.

4. Apparatus of the class described comprising a multiple-hearth furnace having vertically spaced hearths with outlets through which the material introduced at the top of the furnace may pass downwardly to the lowermost hearth and then be discharged from the furnace, means at the outlets of two hearths to prevent passage of gases through these outlets and divide the furnace into an uppermost drying section, an intermediate burning section and a lowermost section for subjecting the gases to high temperatures for complete combustion thereof and removal of noxious odors before discharge from the furnace, means for supplying preheated air to the upper part of the burning section, a duct conducting hot gases from the lower part of the burning section to the upper part of the drying section, a duct connecting the lower part of the drying section with the lower part of the lowermost section of the furnace, and a flue connected with said lowermost section to discharge gases of combustion from the furnace.

5. Apparatus of the class described comprising a multiple-hearth furnace having vertically spaced hearths with outlets through which the material introduced at the top of the furnace may pass downwardly to the lowermost hearth and then be discharged from the furnace, means at the outlets of two hearths to prevent passage of gases through these outlets and divide the furnace into an uppermost drying section, an intermediate burning section and a lowermost section for subjecting the gases to high temperatures to complete combustion thereof and removal of noxious odors before discharge from the furnace, means for supplying preheated air to the upper part of the burning section, a duct conducting hot gases from the lower part of the burning section to the upper part of the drying section, a second duct conducting hot gases from the lower part of the burning section to the lowermost section, a third duct conducting gases from the lower part of the drying section to the lower part of the lowermost section of the furnace, and a flue connected with said lowermost section to discharge gases of combustion from the furnace.

6. Apparatus of the class described comprising a multiple-hearth furnace having vertically spaced hearths with outlets through which the material introduced at the top of the furnace may pass downwardly to the lowermost hearth and then be discharged from the furnace, means at the outlets of two hearths to prevent passage of gases through these outlets and divide the furnace into an uppermost drying section, an intermediate burning section and a lowermost section for subjecting the gases to high temperatures to complete combustion thereof and removal of noxious odors before discharge from the furnace, means for supplying preheated air to the upper part of the burning section, a duct conducting hot gases from the lower part of the burning section to the upper part of the drying section, a second duct conducting hot gases from the lowermost part of the burning section to the lower section, a third duct conducting gases from the lower part of the drying section to the lower part of the lowermost section of the furnace, means for controlling the flow of hot gases through said second duct, and a flue connected with said lowermost section to discharge gases of combustion from the furnace.

7. Apparatus of the class described comprising a multiple-hearth furnace having vertically spaced hearths with outlets through which the material introduced at the top of the furnace may pass downwardly to the lowermost hearth and then be discharged from the furnace, means at the outlets of two hearths to prevent the passage of gases and divide the furnace into an uppermost drying section, an intermediate burning section and a lowermost section for subjecting the gases to high temperatures to complete combustion thereof and remove noxious odors before discharge from the furnace, means for supplying preheated air to the burning section, a duct conducting hot gases from the burning section to the drying section, a duct connecting the drying section with the lowermost section of the furnace, means including a burner for raising the temperature in said lowermost section to complete the burning of the gases from the other sections and eliminate noxious odors, and means for drawing the final gases of combustion from said lowermost section.

8. Apparatus of the class described comprising a multiple-hearth furnace having vertically spaced hearths with outlets through which the material introduced at the top of the furnace may pass downwardly to the lowermost hearth and then be discharged from the furnace, means at the outlets of two hearths to prevent the passage of gases and divide the furnace into an uppermost drying section, an intermediate burning section and a lowermost section for subjecting the gases to high temperatures to complete combustion thereof and remove noxious odors before discharge from the furnace, rabbling means to feed material on said hearths to their outlets including a hollow shaft and devices extending radially therefrom over the various hearths, means for passing air upwardly through said shaft to be heated as it passes through the lowermost section and part of said burning section, said hollow shaft having outlets through which air is supplied to the upper part of the burning section, means conducting hot gases from the lower part of the burning section to the drying section, means for conducting gases and vapors from said drying section to said lowermost section, and means for heating said lower section to complete combustion of the gases and eliminate noxious odors.

9. Apparatus for treating material which comprises passing the material downwardly from zone to zone through a plurality of zones, means for detaining the material temporarily in each zone, means for preventing the direct flow of gases between a central burning group of zones, an upper drying group of zones and a lower deodorizing group of zones, means for passing preheated air through the central burning group concurrently with the material for burning said material while in this group, means for passing hot exhaust gases from the central group through the upper group concurrently with the material for drying the material, means for passing gases and vapors from the upper group and hot gases from the central group through the lower group countercurrently to the material, and means for burning the gases in said lower group thereby eliminating odors.

10. Apparatus for treating material which comprises means for passing the material downwardly from zone to zone through a plurality of zones, means for detaining the material temporarily in each zone, means for preventing the direct flow of gases between a central burning group of zones, an upper drying group of zones and a lower deodorizing group of zones, means for passing preheated air through the central burning group concurrently with the material for burning said material while in this group, means for passing hot exhaust gases from the central group through the upper group concurrently with the material for drying the material, means for passing gases and vapors from the upper group and hot gases from the central group through the lower group countercurrently to the material, means for varying the proportions of hot gases passing from the central group to the drying group and the lower group to control the drying, and means for burning the gases in the lower group and eliminating odors.

WILLIAM RAISCH.